United States Patent
Dvorsky (10) Patent No.: US 10,663,369 B2
(45) Date of Patent: May 26, 2020

(54) SYSTEMS AND METHODS FOR DETECTING A WATER LEAK

(71) Applicant: NIKOLA LABS, Westerville, OH (US)

(72) Inventor: James Dvorsky, Westerville, OH (US)

(73) Assignee: Nikola Labs LLC, Westerville, OH (US)

( * ) Notice: Subject to any disclaimer, the term of this patent is extended or adjusted under 35 U.S.C. 154(b) by 0 days.

(21) Appl. No.: 15/763,154

(22) PCT Filed: Jan. 5, 2018

(86) PCT No.: PCT/US2018/012496
§ 371 (c)(1),
(2) Date: Mar. 26, 2018

(87) PCT Pub. No.: WO2018/129262
PCT Pub. Date: Jul. 12, 2018

(65) Prior Publication Data
US 2019/0145848 A1   May 16, 2019

Related U.S. Application Data (60) Provisional application No. 62/442,968, filed on Jan. 5, 2017.

(51) Int. Cl.
*G01M 3/18* (2006.01)
*G05D 7/06* (2006.01)

(52) U.S. Cl.
CPC ............ *G01M 3/18* (2013.01); *G05D 7/0617* (2013.01); *Y10T 137/7761* (2015.04)

(58) Field of Classification Search
CPC ... G01M 3/18; G05D 7/0617; Y10T 137/7761

USPC ........................................................ 137/487.5
See application file for complete search history.

(56) References Cited

U.S. PATENT DOCUMENTS

| | | | | |
|---|---|---|---|---|
| 6,186,162 | B1* | 2/2001 | Purvis | D06F 39/081 |
| | | | | 122/504.2 |
| 6,487,457 | B1* | 11/2002 | Hull | G05B 15/02 |
| | | | | 700/17 |
| 7,119,698 | B2* | 10/2006 | Schleich | G01M 3/2807 |
| | | | | 340/605 |
| 7,920,983 | B1* | 4/2011 | Peleg | G01M 3/2807 |
| | | | | 702/100 |
| 2002/0033759 | A1 | 3/2002 | Morello | |
| 2010/0045471 | A1 | 2/2010 | Meyers | |

(Continued)

OTHER PUBLICATIONS

International Search Report and Written Opinion issued in PCT Application No. PCT/US18/12496 dated Mar. 26, 2018.

*Primary Examiner* — William M McCalister
(74) *Attorney, Agent, or Firm* — Benesch, Friedlander, Coplan & Aronoff LLP (57) ABSTRACT

Systems and methods is described herein for detecting a water leak. In an example, a method for detecting a water leak can include receiving at a water monitoring system (WMS) one or more radio-frequency (RF) signals, converting the one or more RF signals to a direct-current (DC) voltage, storing the DC voltage at a storage element, configuring the WMS to monitor a water source for water, generating a control valve signal in response to detecting the water, and providing the control valve signal to a shutoff valve to cause the shutoff valve to cut-off the flow of the water to the water source.

20 Claims, 4 Drawing Sheets

(56) References Cited

U.S. PATENT DOCUMENTS

| | | | |
|---|---|---|---|
| 2010/0164847 A1 | 7/2010 | Lee et al. | |
| 2012/0026004 A1* | 2/2012 | Broniak | E03B 7/075 |
| | | | 340/870.02 |
| 2012/0185184 A1* | 7/2012 | Armon | G05B 23/024 |
| | | | 702/51 |
| 2016/0181873 A1* | 6/2016 | Mitcheson | H01Q 5/364 |
| | | | 307/104 |

* cited by examiner

SYSTEMS AND METHODS FOR DETECTING A WATER LEAK

CROSS-REFERENCE TO RELATED APPLICATION

This application is a U.S. National Stage entry under 35 U.S.C. § 371 of International Application No. PCT/US18/12496, which claims the benefit of U.S. Provisional Patent Application No. 62/442,968, filed Jan. 5, 2017, and entitled "WIRELESSLY-POWERED WATER LEAK DETECTOR," the entire contents of which applications are incorporated herein by reference.

TECHNICAL FIELD

This disclosure generally relates to systems and methods for detecting a water leak.

BACKGROUND

Water leaks are common problems for commercial and residential buildings and can cause a significant amount of damage to structures and contents. Leaks generally occur from a burst water pipe, a leaking faucet, a faulty valve, a broken hose and/or water-using appliances. If an occupant is present and the water leak is visible, water resulting damage can often be mitigated as the occupant can, in most instances, quickly respond and address the water leak. However, leaks can occur in hard to reach places, behind walls, cabinets, back-side of appliances that the occupant is likely to not discover until it's too late, and a very substantial amount of damage has been caused. Thus, buildings can easily have a dozen or more places where such leaks can occur and not be detected by the occupant, or identified efficiently to mitigate the havoc that water leaks can cause. It is not uncommon for the occupant to have to expend a substantial amount of financial resources, energy, and time to return a building to a usable state. Additionally, water leaks can induce the growth of hazardous mold, which can have deleterious effects on the value of the building, and the health of the occupant (or occupants).

SUMMARY

In an example, a method for detecting a water leak can include receiving at a water monitoring system (WMS) one or more radio-frequency (RF) signals, converting the one or more RF signals to a direct-current (DC) voltage, storing the DC voltage at a storage element, configuring the WMS to monitor a water source for water, generating a control valve signal in response to detecting the water, and providing the control valve signal to a shutoff valve to cause the shutoff valve to cut-off the flow of the water to the water source.

In another example, a WMS for monitoring a water source for a water leak can include an enclosure. The enclosure can include an antenna that can be configured to receive one or more RF signals. The enclosure can further include an RF harvester that can be configured to generate electrical energy based on the one or more RF signals, a storage element that can be configured to store the generated electrical energy, and a voltage terminal that can be configured to receive a biasing voltage based on the electrical energy stored at the storage element. The voltage terminal can be partially exposed to a surrounding environment. The enclosure can further include a field effect transistor (FET) that can include an input terminal and an output terminal. The input terminal can be partially exposed to the surrounding environment. An input voltage at the input terminal can be generated based on the biasing voltage in response to forming a conductive path between the voltage terminal and the input terminal. The conductive path can be formed between the voltage terminal and the input terminal when water from the water source comes into contact with both the partially exposed voltage terminal and the partially exposed input terminal. The enclosure can include a controller that can be configured to monitor the output terminals for an output voltage. The output voltage can provide an indication of a water leak at the water source. The controller can be configured to generate a control valve signal based on the output voltage. The control valve signal can be provided to a shutoff valve to cut-off a flow of the water to the water source.

In a further example, a method for detecting a water leak can include receiving one or more RF signals, converting the one or more RF signals to a DC voltage, storing the DC voltage at a storage element, generating a biasing voltage at a voltage terminal based on the stored DC voltage, and generating an input voltage at an input terminal of a FET based on the biasing voltage in response to forming a conductive path between the voltage terminal and the input terminal. The conductive path can be formed between the voltage terminal and the input terminal when water from a water source comes into contact with the voltage terminal and the input terminal. The method can further include generating an output voltage at output terminals of the FET based on the input voltage at the input terminal. The output voltage can provide an indication of a water leak at the water source. The method can further include monitoring the output terminals for the output voltage, generating a control valve signal based on the output voltage and controlling a shutoff valve to cut-off a flow of the water to the water source based on the control valve signal.

The summary is provided merely for purposes of summarizing some example embodiments so as to provide a basic understanding of some aspects of the disclosure. Accordingly, it will be appreciated that the above described examples should not be construed to narrow the scope or spirit of the disclosure in any way. Other examples, embodiments, aspects, and advantages will become apparent from the following detailed description taken in conjunction with the accompanying drawings.

DETAILED DESCRIPTION

Several products have become commercially available to aid building owners to detect when water leaks. However, existing water leak detection systems have drawbacks, and in some instances, substantial drawbacks. For example, some water leak detection systems are configured to emit an audible alarm when water is sensed to warn the building occupant that a water leak has occurred. However, unlike fire detectors, water sensors are intended to save property, not lives, so emitting an alarm when no one is present to take mitigating action is of little or no value. More complex water leak detection systems have been designed to address the shortcomings of audible alarm emitting water based leak detection systems. However, these systems require close proximity to a shutoff valve as these systems need to be hard-wired to the shutoff valve.

Furthermore, water leak detection systems have been designed to transmit via radiofrequency (RF) a detection signal to actuate the electronic shutoff valve. These systems are powered by batteries (e.g., rechargeable batteries) and are configured to monitor continuously for the presence of water. However, the battery life of these systems is short and require that the building occupant change the batteries (or recharge the rechargeable batteries) frequently. Thus, existing RF based water leak detection systems require regular battery maintenance and if such maintenance is not provided, these systems are ineffective in detecting water leaks.

Systems and methods are described herein for detecting a water leak and may address at least some of the problems related to alarm and/or battery based water leak detection systems. According to the systems and methods described herein, water damage can be mitigated and/or prevented in an effective and efficient manner. Thus, the systems and methods described herein can prevent and/or mitigate water damage to building structure and building content(s) before such leaks can be repaired by an occupant. In general, the systems described herein can be integrated into an integrated circuit (IC) or can be provided as a standalone circuit element (or standalone elements) that can be mounted on a surface of a printed circuit board (PCB). In other examples, the systems described herein can be provided as plug-in elements that can be coupled to sockets (receiving terminals) of the PCB. Moreover, the systems described herein can be contained within a waterproof enclosure. Thus, the systems described herein can be completely covered by water, or partially covered with water, such as by water from a leaking water source, without the water penetrating a "waterproof" barrier of the enclosure.

Figure 1:
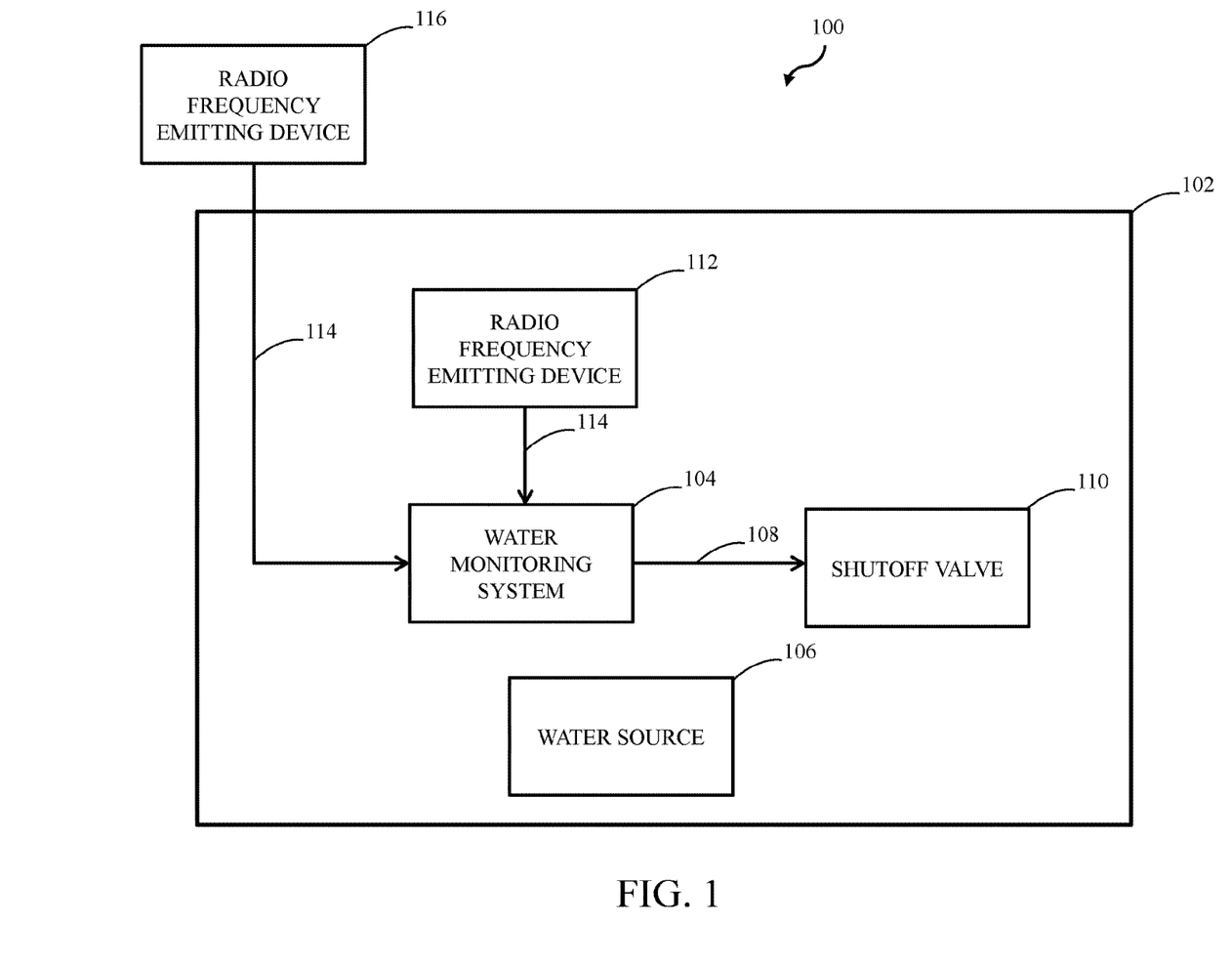
FIG. 1 illustrates an exemplary environment in which systems and methods described herein can be implemented.

FIG. 1 illustrates an exemplary environment 100 in which systems and methods described herein can be implemented. The exemplary environment can include a building 102. The building 102 can correspond to any enclosed structure having outer walls, and at least one room. The building 102 can include a commercial building, a residential building, and a combination thereof. The commercial building and/or residential building can include a multi-level building, which can have multiple levels or floors. A water monitoring system (WMS) 104 can be employed nearby a water source 106. The WMS 104 can be employed at the water source 106 to monitor for a water leak. Thus, the WMS 104 can be positioned in water-detection proximity of the water source 102. Although not illustrated in FIG. 1, the WMS 104 can be arranged relative to the water source 106 such that it can be in contact with the water source 106.

In some examples, the water source 106 can be located inside the building 102, as illustrated in FIG. 1. In other examples, the water source 106 can be located outside the building 102. The water source 106 can include any apparatus, appliance, structure, or the like, at which water can be present. Thus, the water source 106 can include, but not limited to, a pipe, a plumbing fixture (e.g., a valve, faucet, etc.), or the like. In some examples, the water source 106 can include water appliances, including, but not limited to, water purification systems, coffee systems, dishwashers, clothes washers, water heaters, humidifiers, geothermal systems, etc.

The water source 106 can experience a failure, a malfunction, a break-down in structural integrity, or an event that can lead to water leakage. Although not illustrated in FIG. 1, the leaked water can come into contact with the WMS 104. The WMS 104 can be configured to detect the water and in response generate a control valve signal 108. The control valve signal 108 can be provided to a shutoff valve 110. In some examples, the shutoff valve 110 is an electronic shutoff valve.

In some examples, the control valve signal 108 can be transmitted wirelessly by the WMS 104 to the shutoff valve 110, e.g., via WiFi, Bluetooth and/or cellular or other wireless communication protocols. Thus, the WMS 104 and the shutoff valve 110 can be configured to communicate wirelessly. In another example, the WMS 104 can be configured to transmit the control valve signal 108 over a physical wire to the shutoff valve 110. In an even further example, the WMS 104 can be configured to transmit the control valve signal 108 to another system such as a home security system, a water service utility, a monitoring service, or a wireless personal communication device, a cellular device, and/or a tablet (not shown in FIG. 1), which can be configured to control the shutoff valve 110. The shutoff valve 110 can be configured to control a flow of water to the water source 106 based on the control valve signal 108. For example, the shutoff valve 110 can be configured to restrict the flow of the water to the water source 106, and thus subdue the water leakage.

In some examples, the WMS 104 has no battery for powering one or more internal elements, as described herein. The WMS 104 can be configured to harvest RF energy from a surrounding environment, e.g., emitted from a RF emitting device 112 or devices 112,116 to power the one or more internal elements. In some examples, the WMS 104 can be configured to receive one or more RF signals 114 in an associated RF band. In some examples, the one or more RF signals 114 in a band near 900 Megahertz (MHz) can be used, while in other examples, the WMS 104 can be configured to harvesting energy from one or more RF signals 114 in other frequency bands, including, but not limited to, very high frequency (VHF) and ultra-high frequency (UHF) bands, or other bands such as 10 MHz-88 MHz, 88 MHz-108 MHz, 108 MHz-500 MHz, 500 MHz-900 MHz, 900 MHz-1 GHz, 1 GHz-2.4 GHz, 2.4 GHz-2.5 GHz, 2.5 GHz-5 GHz, 5 GHz-6 GHz, 6 GHz-10 GHz, or 10 GHz-100 GHz.

By harvesting RF energy from its surrounding environment, the WM 104 does not require a battery for leak detection purposes, and consequently, does not need periodic maintenance, as existing water monitoring systems. Existing water monitoring systems are based on battery-powered technology and can necessitate frequent maintenance of their batteries (e.g., charging and/or replacement). The WMS 104 is designed for battery-free operation or on-demand usage, or when sufficient charge has accumulated at a storage element of the WMS 104. Thus, in some examples, the WMS 104 can be free of connectors, cables, and battery access panels, and have freedom of placement and mobility during its application use. Accordingly, the WMS 104 has particular advantages over existing water monitoring systems.

The surrounding environment can include the building 102 and, in some examples, areas surrounding the building 102. Areas surrounding the building 102 can include, but not limited to, a front-yard, a back-yard, a drive-way, a premise, a garage, or the like. In some examples, the WMS 104 can be configured to continuously (or periodically) monitor for RF emissions by the RF emitting device 112, or the RF emitting devices 112,116. The RF emitting device 112 can be located within the building 102 in FIG. 1. However, in other examples, the RF emitting device 112 can be located in an area surrounding the building 102, as the RF emitting device 116.

The WMS 104 can be configured to receive one or more RF signals 114 emitted by the RF emitting device 112 in its surrounding environment. In some examples, the WMS 104 can be configured to receive the one or more RF signals 114 emitted by the RF emitting device 112 located in the building 102, and another RF emitting device 116 located outside the building 102. Thus, the WMS 104 can be configured to harvest RF energy 114 from a plurality of RF emitting devices 112,116 in its surrounding environment. The RF emitting devices 112,116 can include, but not limited to, a wireless fidelity (or "WiFi") router, a WiFi-connected device, a Bluetooth device, a long-range (LoRa) radio, a cellular communication network, a licensed radio transmitter, a device operating in the industrial, scientific and medical (ISM) band, a near-field communication (NFC) device, a magnetic resonance source, a magnetic induction source, or any device (or system) that can emit RF energy to be captured by the WMS 104. The RF emitting devices 112,116 can be configured to communicate with one or more other devices (not shown in FIG. 1) within the RF emitting devices wireless operating range. The one or more RF signals 114 can be intended for the one or more other devices. Thus, the WMS 104 can be configured to capture the one or more RF signals 114 and harvest energy from the captured signals, as described herein.

The WMS 104 can be configured to convert the one or more RF signals 114 (or RF energy 114) to electrical energy, e.g., via an RF harvester 208 described below. In some examples, the one or more RF signals 114 can include modulated RF signals such as direct-sequence spread spectrum (DSSS) signals. The electrical energy can be stored at the storage element of the WMS 104. The stored electrical energy can be used by the WMS 104 to power its one or more internal elements during one or more operating states of the WMS 104. The one or more operating states can include a harvesting state, a monitoring state, and an alerting state. In the monitoring state, the WMS 104 can be configured to draw less operating power than in the harvesting state and/or the alerting state. The WMS 104 can be configured to the harvest RF energy 114 in its environment until a given amount of electrical energy has been stored at the storage element.

For example, the WMS 104 can be configured in either the harvesting or monitoring states to periodically (or continuously) to determine whether sufficient electrical energy is available at the storage element. The WMS 104 can be configured to determine an amount of DC voltage at the storage element. The WMS 104 can be configured to compare the amount of DC voltage at the storage element to a DC voltage threshold. The one or more states of the WMS 104 can be controlled based on a result of the comparison. For example, the WMS 104 can be configured to operate in the monitoring state based on the result of the comparison indicating that the amount of DC voltage at the storage element is equal to or within a given percentage (e.g., 5%) of the DC voltage threshold. Alternatively, or additionally, if the WMS 104 is in the monitoring state, and it is determined that additional electrical energy is needed at the storage element, the WMS 104 can be configured to operate in the harvesting state. For example, in response to determining that not enough electrical energy is stored at the storage element to power one or more of its internal elements, or perform one or more functions (e.g., sense the presence of water, transmit the control valve signal 108, etc.), the WMS 104 can be configured to operate in the harvesting state.

In the harvesting state, the WMS 104 can be configured to capture the one or more RF signals 114. The one or more RF signals 114 can be converted to electrical energy and stored at the storage element. The WMS 104 can be configured to periodically (or continuously) compare the amount of DC voltage at the storage element to the DC voltage threshold during RF energy harvesting. When the amount of DC voltage at the storage element is equal to or within the given percentage of a prescribed threshold value, the WMS 104 can cease harvesting RF energy, and transition back into the monitoring state.

The one or more internal elements of the WMS 104 can draw negligible power in the monitoring state over time. The WMS 104 in the monitoring state can lie dormant until the water leak occurs at the water source 106. Thus, the WMS 104 can be configured to monitor for the water at the water source. The WMS 104 can be configured to switch to the alerting state in response to detecting the water leak at the water source 106. Water is known to exhibit an associated conductivity. Thus, the water's own conductivity can be used to control the one or more states of the WMS 104. For example, the WMS 104 can be configured to switch to the alerting state from the monitoring state in response to coming in contact with water having a conductivity, greater than one milliSiemens per meter (1 mS/m). As a point of reference, drinking water typically has a conductivity between 5 and 50 mS/m at room temperature. Leaked water readily dissolves ions from the surfaces on which it makes contact and becomes more conductive. When the water has the given amount of conductivity, a voltage can be established, and the WMS 104 can be configured to detect the established voltage. Accordingly, the water can come into contact with the WMS 104 and trigger the alerting state in the WMS 104.

In the alerting state, the WMS 104 can be configured to generate the control valve signal 108. The control valve signal 108 can be used to control the shutoff valve 110. The storage element can store sufficient electrical energy such that the WMS 104 can be configured to switch states (e.g., from the monitoring state to the alerting state) in response to detecting the leaked water, and transmit the control valve signal 108. The shutoff valve 110 can be configured to cut-off water flow to the water source 106 based on the control valve signal 110. The leaked water can be cleaned-up, and the WMS 104 can be dried and positioned once again near the water source 106 to monitor the water source 106 for a future water leak. Alternatively, the WMS 104 can be allowed to naturally dry out if it is inconvenient to retrieve the WMS 104 and dry its surfaces. The WMS 104 can be configured to operate in the monitoring state in response to detecting no water. For example, the WMS 104 can be configured to switch to the monitoring state from the alerting state in response to no water being in contact with the WMS 104. Thus, the WMS 104 can be configured to switch to the monitoring state in response to not detecting the conductivity associated with the water. Accordingly, the WMS 104 can be configured to monitor for water leaks at the water source 106.

Figure 2:
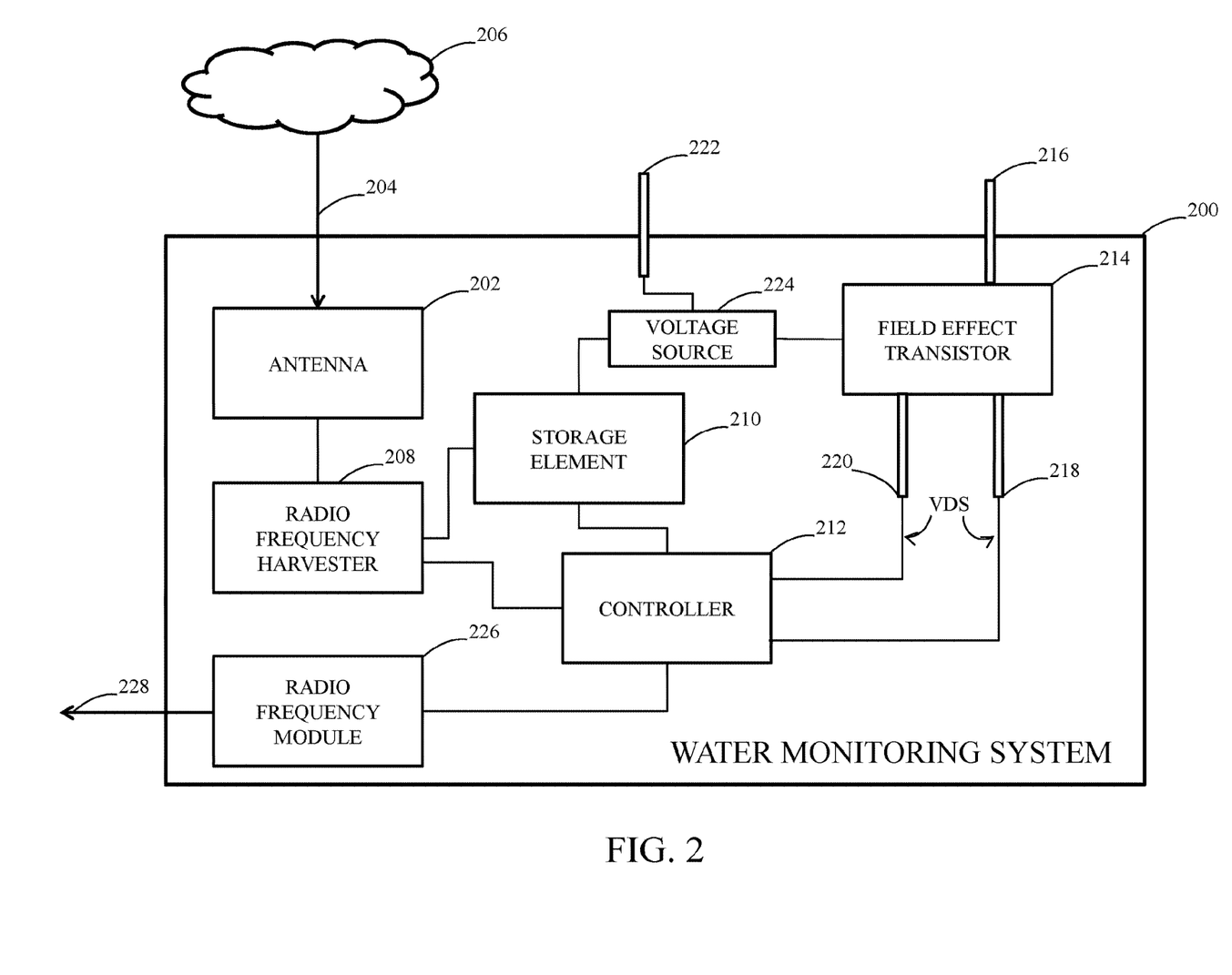
FIG. 2 illustrates an example of a water monitoring system.

FIG. 2 illustrates an example of a water monitoring system (WMS) 200. The WMS 200 can correspond to the WMS 104, as illustrated in FIG. 1. The WMS 200 can be employed nearby a water source, such as the water source 106, as illustrated in FIG. 1. The WMS 200 can be employed to monitor for water leakage at the water source. Thus, the WMS 200 can be positioned in water-detection proximity of the water source. The WMS 200 can be arranged relative to the water source such that it is in contact with the water source.

The WMS 200 can include an antenna 202. The antenna 202 can be configured to receive RF energy 204. The antenna 202 can be tuned to a given frequency of an associated frequency band, as described herein. For example, the antenna 202 can be tuned to 2.45 GHz, a commonly used frequency by wireless routers, WiFi capable of devices, Bluetooth devices, and the like. The antenna 202 can be configured to receive one or more RF signals 204 from a communication environment 206. The communication environment 206 can include a building (not shown in FIG. 2), such as the building 102, as illustrated in FIG. 1. The communication environment 206 can further include at least one RF emitting device (not shown in in FIG. 2). The at least one RF emitting device can correspond to the RF emitting device 112, or the RF emitting devices 112,116, such as illustrated in FIG. 1. Thus, in some examples, the WMS 200 can be configured to receive the RF energy 204 from a plurality of RF emitting devices, which can be similar or different types of devices. Accordingly, in some examples, the one or more RF signals 204 can correspond to the one or more RF signals 114, as illustrated in FIG. 1.

The RF energy 204 received by the antenna 202 can be used to power one or more elements of the WMS 200, as described herein. The WMS 200 can include an RF harvester 208. In some examples, the antenna 202 and the RF harvester 208 can be a single element. The RF harvester 208 can be configured to harvest RF energy from a surrounding environment, as described herein. The RF harvester 208 can be configured to convert the one or more RF signals 204 received by the antenna 202 into usable energy. The RF harvester 206 can be configured to convert the RF energy 204 received at the antenna 202 to electrical energy. The RF harvester 208 can include one or more elements (e.g., components, circuits, etc.) that can be configured to convert the received RF energy 204 to electrical energy. Thus, the RF harvester 208 can include, but not limited to, antenna matching, rectifying circuitry, voltage transforming circuitry, and/or other performance optimizing circuitry. The rectifying circuitry can include a diode(s), a transistor(s), or some other rectifying device or combination. Examples of the rectifying circuitry can include, but are not limited to, half-wave, full-wave, and voltage doubling circuits. U.S. application Ser. No. 14/882,754, incorporated by reference, herein, shows examples of RF harvesters that can be adapted and configured to implement the RF harvester 208 and associated functions, as described herein.

The RF harvester 208 can be configured to output a DC voltage based on the RF energy 204. The RF harvester 208 can be configured to receive an input signal. The input signal can be used to control the RF harvester 208 to vary the outputted DC voltage (e.g., an amplitude), or improve a performance of the RF harvester 208 (e.g., efficiency). The input signal can include, but not limited to, a DC voltage or a clock. In some examples, the RF harvester 208 can include a power regulation circuit. The power regulation circuit can be used to regulate the converted power (e.g., hold the outputted DC voltage at a constant level). The power regulation circuit can be configured to regulate the outputted DC voltage such that the voltage maintains a constant amplitude. The power regulation functionality of the RF harvester 208 can be implemented in many different ways. Thus, the power regulation circuit can include one of a Zener diode, an integrated circuit such as a linear voltage regulator, a switching regulator, and a combination thereof.

The WMS 200 can include a storage element 210. The storage element 210 can include one or more capacitors (not shown in FIG. 2). The DC voltage generated by the RF harvester 208 can be stored at the storage element 210. The WMS 200 can be configured to operate in one or more states. The stored DC voltage can be used to power the one or more elements of the WMS 200 during the one or more states. The one or more states can include a harvesting state, a monitoring state, and an alerting state. The WMS 200 can include a controller 212 that can be configured to control the one or more states of the WMS 200. The controller 212 can be configured to periodically (or continuously) to determine whether sufficient electrical energy is stored at the storage element 210 to power the one or more elements of the WMS 200. The one or more elements can include, but not limited to, the RF harvester 208, the controller 212, a field effect transistor (FET) 214, a voltage source 222, and an RF module 226.

The controller 212 can be configured to determine an amount of DC voltage at the storage element 210. It is to be understood that for a given amount of capacitance, the amount of voltage at the capacitance is directly proportional to the amount of charge stored at the capacitance. The controller 212 can be configured to compare the amount of DC voltage at the storage element 210 to a DC voltage threshold. The one or more states of the WMS 200 can be controlled based on a result of the comparison. For example, the WMS 200 can be configured to switch to the monitoring state from the harvesting state based on the result of the comparison indicating that the amount of DC voltage at the storage element 208 is equal to or within a given percentage (e.g., 5%) of the DC voltage threshold. In the monitoring state, the RF harvester 208 can be turned-off by the controller 212 such that it is not harvesting electrical energy from its surrounding environment, and thus not drawing energy. Additionally, in the monitoring state, the controller 212 can be configured to turn-off other elements of the WMS 200 such that these elements do not draw energy.

Alternatively, or additionally, the WMS 200 can be configured to operate in the harvesting state based on the result of the comparison indicating that the amount of DC voltage at the storage element 210 is less than the DC voltage threshold. In the harvesting state, the controller 212 can be configured to generate the input signal. The input signal can be provided to the RF harvester 208 to turn-on the RF harvester 208. In response to receiving the input signal, the RF harvester 208 can be configured to convert additional electrical energy based on the one or more RF signals 204 received at the antenna 202. The additional electrical energy can be stored at the storage element 210 as electrical charge. The controller 212 can be configured to periodically (or continuously) compare the amount of DC voltage at the storage element 210 to the DC voltage threshold during RF energy harvesting. When the DC voltage at the storage element 210 is equal to or within the given percentage of the DC threshold, the WMS 200 can cease harvesting RF energy. For example, the controller 212 can be configured to stop providing the input signal in response to which the RF harvester 208 can cease harvesting the RF energy 204. In other examples, the controller 212 can be configured to provide a second input signal to the RF harvester 208, which in response, can cease harvesting the RF energy 204.

The WMS 200 can include a FET 214. The FET 214 can include, but not limited to, one or more semiconductor field-effect transistors (FETs), such as, but not limited to metal oxide semiconductor field-effect transistors (MOSFETs). The controller 212 can be configured to control the operating state of the WMS 200 in response to detecting an output voltage VDS at the FET 214. The FET 214 can include a plurality of terminals. In some examples, the FET 214 can include an input terminal 216, and a plurality of output terminals 218,220. The input terminal 216 can correspond to a gate terminal, and the plurality of output terminals 218,220 can correspond to drain and source terminals. Therefore, the FET 214 can include a gate terminal 216, a drain terminal 218, and a source terminal 220.

The WMS can include a voltage terminal 222. The voltage terminal 222 can be coupled to a voltage source 224, as illustrated in FIG. 2. In some examples, the voltage source 224 is a DC voltage source. In other examples, the voltage source 224 is an alternating-current (AC) source. In further examples, the voltage source 224 is the storage element 210. The voltage source 224 can be coupled to the FET 214. The voltage source 224 can be configured to generate a biasing voltage. The biasing voltage can be applied to the gate terminal 216. The biasing voltage can include one of a DC voltage, an AC voltage, and a zero voltage. When the voltage terminal 222 is coupled to zero voltage, it is typically coupled to a reference or common voltage of WMS 200.

A portion of the WMS 200 can be housed within an enclosure (not shown in FIG. 2). As described herein, the enclosure can correspond to a waterproof enclosure, and the one or more elements of the WMS 200 can be sealed therein from a surrounding environment. In some examples, the gate terminal 216 and the voltage terminal 222 can be configured to partially protrude into the surrounding environment. As shown in FIG. 2, a portion of the gate terminal 216 and a portion of the voltage terminal 222 can be exposed to the surrounding environment. The drain terminal 218 and the source terminal 220 can be within the enclosure of the WMS 200 such that the terminals 218,220 are secure from the surrounding environment.

The WMS 200 can be configured relative to the water source to monitor the water source for a water leak. When no water is present, there is no conductive path between the gate terminal 216 and the voltage terminal 222. During a water leak, water from the water source can come into contact with the gate and voltage terminals 216,222. For example, the water can come into contact with the portion of the terminals 216,222 being exposed to the surrounding environment. The water can form a conductive path between the voltage terminal 222 and the gate terminal 216. In response, the biasing voltage can be applied to the gate terminal 216. Consequently, a value of a gate voltage at the gate terminal 216 can be modified by means of the created water conductivity path. Accordingly, the water's own conductivity can be utilized to trigger a response at a high impedance gate input of the FET 214. In some examples, the high impedance gate input is the gate terminal 216.

The drain and source terminals 218,220 can be coupled to the controller 212. The controller 212 can be configured to monitor the drain and source terminals 218, 220 of the FET 214 for the output voltage VDS, for example, during the monitoring state. The output voltage VDS can be representative of the water leak at the water source. The output voltage VDS can be generated based on the source voltage. When water is present between the gate and voltage terminals 216,222, the gate terminal 216 can be configured to receive the biasing voltage and permit a drain-source channel within the FET to act like a short circuit and permit a flow of current. The controller 212 can be configured to detect the output voltage VDS. The controller 212 can be configured to operate the WMS 200 in the alerting state based on the output voltage VDS. Thus, the controller 212 can be configured to detect the water leak at the water source based on the output voltage VDS at the drain and source terminals 218,220. In the alerting state, the controller 212 can be configured to generate a control valve signal. The control valve signal can be used to control a shutoff valve, such as the shutoff valve 110, as illustrated in FIG. 1.

The WMS 200 can include an RF module 226. The RF module 226 can include, but not limited to, a printed circuit board, a transmitter circuit, a receiver circuit, an antenna, and a serial interface for communication with the controller 212. In some examples, the RF module 226 can correspond to a long range (LoRa) wireless RF module. The LoRa wireless RF module can be configured to operate at 915 MHz. LoRa wireless RF modules are known to operate well over two kilometers, and, in some applications, up to ten kilometers via light-of-sight. Hence distances within a building are well within the range capability of the LoRA wireless RF module.

While in the alerting state, the RF module 226 can be configured to receive the control valve signal and generate a representative RF control valve signal 228. The RF module 216 can be configured to transmit the RF control valve signal 228 to the shutoff valve. The shutoff valve can be configured to receive RF signals generated by the RF module 226. The shutoff valve can be configured to cut-off water flow to the water source based on the RF control valve signal 226. In some examples, the shutoff valve can contain a manual override that permits a user to open and/or close the shutoff valve at any time. The storage element 210 can store sufficient electrical energy such that the WMS 200 can be configured to switch states (e.g., from the monitoring state to the alerting state), and transmit the RF control valve signal 226.

The leaked water can be cleaned-up, and the WMS 200 can be dried and positioned once again near the water source to monitor the water source for a future water leak. Alternatively, the WMS 200 can be allowed to naturally dry out if it is inconvenient to retrieve the WMS 200 and dry its surfaces. The WMS 200 can be configured to switch to the monitoring state in response to detecting no water. For example, the WMS 200 can be configured to switch to the monitoring state from the alerting state in response to no water being in contact with the gate terminal 216 of the FET 212. The controller 212 can be configured to switch the WMS 200 to the monitoring state from the alerting state in response to not detecting the output voltage VDS. When in the monitoring state, the WMS 200 can lie dormant and monitor for a future water leak at the water source.

Additionally, or alternatively, when in the monitoring state, the controller 212 can be configured to compare the amount of DC voltage at the storage element 210 to the DC voltage threshold. If the DC voltage at the storage element 208 is equal to or within the given percentage of the DC threshold, the WMS 200 can remain in the monitoring state. If the DC voltage at the storage element 210 is less than the given percentage of the DC threshold, the controller 212 can be configured to transmit a signal to the RF harvester 208 to convert RF energy into DC energy and the WMS 200 can be configured to switch the harvesting state.

Figure 3:
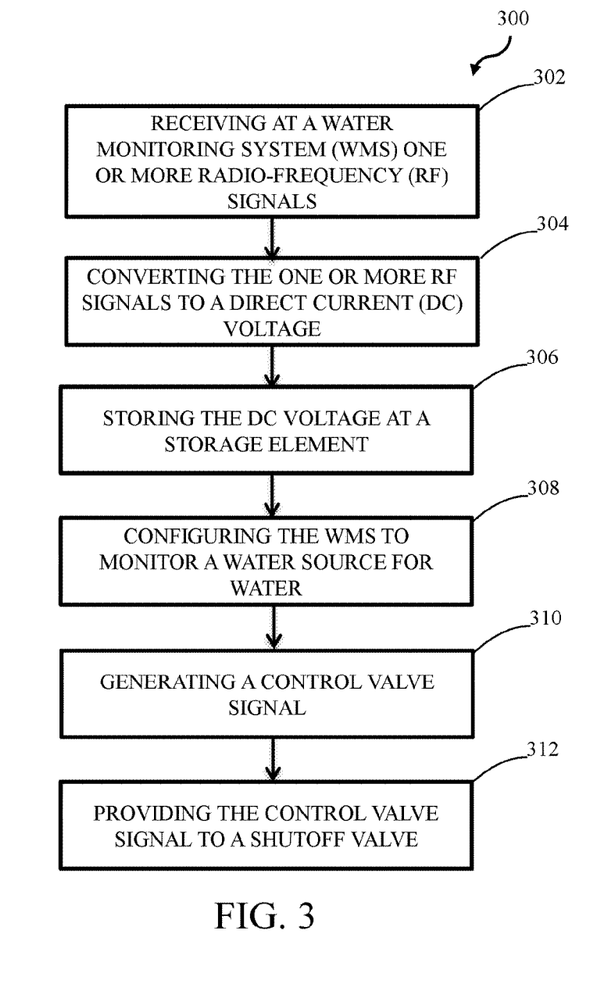
FIG. 3 illustrates an example of a flow diagram illustrating an exemplary method for detecting a water leak.
Figure 4:
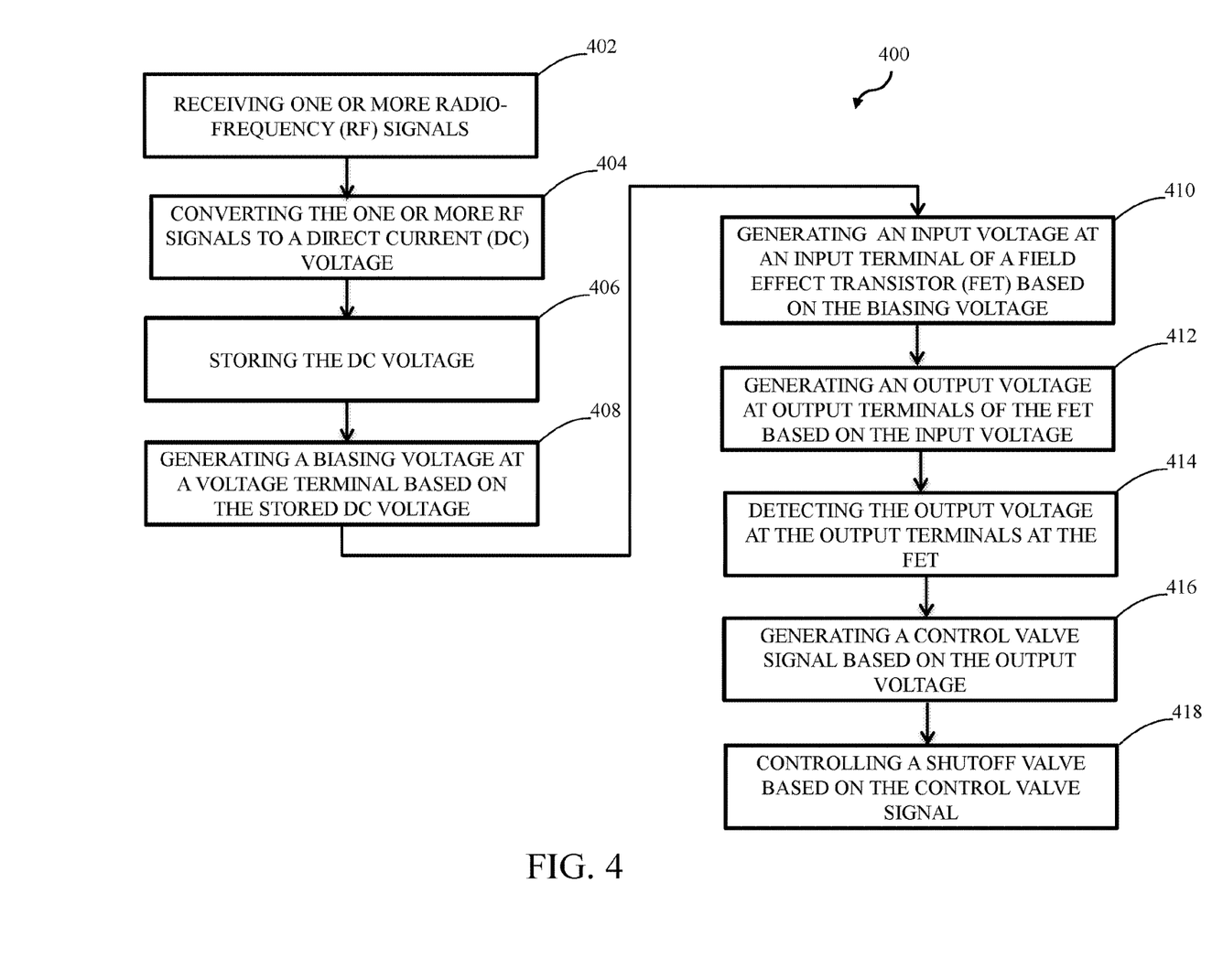
FIG. 4 illustrates another example of a flow diagram illustrating an exemplary method for detecting a water leak.

In view of the foregoing structural and functional features described above, a method that can be implemented will be better appreciated with reference to FIGS. 3-4. While, for purposes of simplicity of explanation, the methods of FIGS. 3-4 are shown and described as executing serially, it is to be understood and appreciated that such method is not limited by the illustrated order, as some aspects could, in other embodiments, occur in different orders and/or concurrently with other aspects from that shown and described herein. Moreover, not all illustrated features may be required to implement a method.

FIG. 3 illustrates an example of a flow diagram illustrating an exemplary method for detecting a water leak. The method begins at 302 by receiving at a water monitoring system (WMS) one or more RF signals. The WMS can correspond to the WMS 104, as illustrated in FIG. 1, or the WMS 200, as illustrated in FIG. 2. At 304, converting the one or more RF signals to a DC voltage. At 306, storing the DC voltage at a storage element. In some examples, the storage element can be part of the WMS. In some examples, the WMS can be configured to operate in a first state in response to a given amount of DC voltage being stored at the storage element. The first state can correspond to a standby state. In the standby state, the WMS can draw negligible power in contrast to a different operating state, such as an awake state.

At 308, configuring the WMS to monitor a water source for water. In some examples, the WMS can be configured to operate in a second state in response to detecting the water at the water source. The second state can correspond to the monitoring state. At 310, generating a control valve signal in response to detecting the water at the water source. In some examples, the control valve signals can be generated while the WMS is in the third state. The third state can correspond to the alerting state. At 312, providing the control valve signal to a shutoff valve (e.g., the shutoff valve, as illustrated in FIG. 1) to cause the shutoff valve to cut-off the flow of water to the water source. In some examples, the shutoff valve can correspond to an electronic shutoff valve. Cutting-off water flow to the water source subdues leakage of the water at the water source.

FIG. 4 illustrates another example of a flow diagram illustrating an exemplary method for detecting a water leak. The method begins at 402, by receiving one or more RF signals. At 404, converting the one or more RF signals to a DC voltage. At 406, storing the DC voltage at a storage element. At 408, generating at a voltage terminal a biasing voltage based on the stored DC voltage. At 410, generating an input voltage at an input terminal of a FET based on the biasing voltage in response to forming a conductive path between the voltage terminal and the input terminal, wherein the conductive path is formed between the voltage terminal and the input terminal when water from a water source comes into contact with the voltage terminal and the input terminal. At 412, generating an output voltage at output terminals of the FET based on the input voltage at the input terminal. At 414, detecting the output voltage at the output terminals. The output voltage can provide an indication of a water leak at the water source. At 416, generating a control valve signal based on the output voltage. At 418, controlling a shutoff valve to cut-off a flow of the water to the water source based on the control valve signal.

What have been described above are examples. It is, of course, not possible to describe every conceivable combination of elements, components, or methods, but one of ordinary skill in the art will recognize that many further combinations and permutations are possible. Accordingly, the disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A method for detecting a water leak comprising:
receiving at a water monitoring system (WMS) one or more radio-frequency (RF) signals;
converting the one or more RF signals to a direct-current (DC) voltage;
storing the DC voltage at a storage element;
configuring the WMS to monitor a water source for water;
generating a control valve signal in response to detecting the water; and
providing the control valve signal to a shutoff valve to cause the shutoff valve to cut-off the flow of the water to the water source.

2. The method of claim 1, further comprising operating the WMS in one of a first state or a second state in response to a given amount of DC voltage being stored at the storage element.

3. The method of claim 2, further comprising operating the WMS in a third state in response to detecting the water at the water source.

4. The method of claim 3, wherein the control valve signal is generated while the WMS is in the third state.

5. The method of claim 4, wherein the WMS draws less operating power in the first state and the second state than the third state.

6. The method of claim 4, wherein providing the control valve signal to the shutoff valve comprises wirelessly transmitting the control valve signal to the shutoff valve.

7. The method of claim 6, wherein the one or more RF signals include one or more WiFi signals.

8. The method of claim 1, wherein a portion of the one or more RF signals is emitted by a first RF emitting device, and another portion of the one or more RF signals is emitted by a second RF emitting device.

9. The method of claim 8, wherein the one or more RF signals are from an associated band, wherein the associated band comprises one of a band near 900 Megahertz (MHz), 10 MHz-88 MHz, 88 MHz-108 MHz, 108 MHz-500 MHz, 500 MHz-900 MHz, 900 MHz-1 Gigahertz (GHz), 1 GHz-2.4 GHz, 2.4 GHz-2.5 GHz, 2.5 GHz-5 GHz, 5 GHz-6 GHz, 6 GHz-10 GHz, and 10 GHz-100 GHz.

10. The method of claim 2, further comprising:
determining the given amount of DC voltage being stored at the storage element;
comparing the given amount of DC voltage being stored at the storage element to a DC voltage threshold; and
operating the WMS in one of the first state and the second state based on a result of the comparison.

11. The method of claim 10, wherein operating the WMS in one of the first state and the second state based on the result of the comparison comprises operating the WMS in the second state based on the result of the comparison indicating that the given amount of DC voltage at the storage element is equal to or within a given percentage of the DC voltage threshold.

12. The method of claim 10, wherein operating the WMS in one of the first state and the second state based on the result of the comparison comprises operating the WMS in the first state based on the result of the comparison indicating that the given amount of DC voltage at the storage element is less than the DC voltage threshold.

13. The method of claim 2, further comprising:
receiving additional RF signals;
converting the additional RF signals to additional DC voltage; and
storing the additional voltage at the storage element until the given amount of DC voltage at the storage element is equal to or within a given percentage of a DC voltage threshold.

14. A water monitoring system (WMS) for monitoring a water source for a water leak comprising an enclosure comprising:
an antenna configured to receive one or more radio-frequency (RF) signals;
an RF harvester configured to generate electrical energy based on the one or more RF signals;
a storage element configured to store the generated electrical energy;
a voltage terminal configured to receive a biasing voltage based on the electrical energy stored at the storage element, wherein the voltage terminal is partially exposed to a surrounding environment;
a field effect transistor (FET) comprising an input terminal and an output terminal, wherein the input terminal is partially exposed to the surrounding environment, wherein an input voltage at the input terminal is generated based on the biasing voltage in response to forming a conductive path between the voltage terminal and the input terminal, wherein the conductive path is formed between the voltage terminal and the input terminal when water from the water source comes into contact with both the partially exposed voltage terminal and the partially exposed input terminal;
a controller configured to monitor the output terminals for an output voltage, wherein the output voltage provides an indication of a water leak at the water source, the controller being configured to generate a control valve signal based on the output voltage, wherein the control valve signal is provided to a shutoff valve to cut-off a flow of the water to the water source.

15. The WMS of claim 14, wherein monitoring the output terminals of FET comprises detecting the output voltage at the output terminals of the FET.

16. The WMS of claim 15, wherein the output voltage at the output terminals of the FET is generated based on the biasing voltage.

17. The WMS of claim 16, wherein the FET comprises one or more semiconductor field-effect transistors (MOSFETs); and
wherein the input terminal corresponds to a gate terminal, and the output terminals correspond to source and drain terminals.

18. The WMS of claim 14, further comprising a plurality of operating states, and wherein the controller is configured to monitor the output terminals for the output voltage during a second state of the plurality of states, and configured to provide the control valve signal to the shutoff valve during a third state of the plurality of states.

19. The WMS of claim 18, wherein the WMS draws less operating power in the second state than in the third state.

20. A method for detecting a water leak comprising:
receiving one or more radio-frequency (RF) signals;
converting the one or more RF signals to a direct-current (DC) voltage;
storing the DC voltage at a storage element;
generating a biasing voltage at a voltage terminal based on the stored DC voltage;
generating an input voltage at an input terminal of a field effect transistor (FET) based on the biasing voltage in response to forming a conductive path between the voltage terminal and the input terminal, wherein the conductive path is formed between the voltage terminal and the input terminal when water from a water source comes into contact with the voltage terminal and the input terminal;
generating an output voltage at output terminals of the FET based on the input voltage at the input terminal, wherein the output voltage provides an indication of a water leak at the water source;
detecting the output voltage at the output terminals;
generating a control valve signal based on the output voltage; and
controlling a shutoff valve to cut-off a flow of the water to the water source based on the control valve signal.

* * * * *